(12) United States Patent
Betin

(10) Patent No.: US 6,480,327 B1
(45) Date of Patent: Nov. 12, 2002

(54) HIGH POWER LASER SYSTEM WITH FIBER AMPLIFIERS AND LOOP PCM

(75) Inventor: Alexander Betin, Manhattan Beach, CA (US)

(73) Assignee: HRL Laboratories, LLC, Malibu, CA (US)

(*) Notice: Subject to any disclaimer, the term of this patent is extended or adjusted under 35 U.S.C. 154(b) by 0 days.

(21) Appl. No.: 09/659,389

(22) Filed: Sep. 11, 2000

(51) Int. Cl.⁷ .............................. H01S 3/063; H01S 3/13
(52) U.S. Cl. .................... 359/338; 359/349; 372/6; 372/29.016; 372/29.013
(58) Field of Search .................... 372/21, 6, 29.016, 372/29.023, 70, 98, 99, 68; 359/338, 349

(56) References Cited

U.S. PATENT DOCUMENTS

| | | | |
|---|---|---|---|
| 4,321,550 A | * 3/1982 | Evtuhov | 359/240 |
| 4,429,393 A | * 1/1984 | Giuliano | 356/459 |
| 4,757,268 A | * 7/1988 | Abrams et al. | 359/333 |
| 4,815,079 A | * 3/1989 | Snitzer et al. | 372/6 |
| 5,119,383 A | * 6/1992 | Duling, III | 372/18 |
| 5,121,400 A | * 6/1992 | Verdiell | 372/32 |
| 5,208,699 A | * 5/1993 | Rockwell | 359/334 |
| 5,233,673 A | * 8/1993 | Vali et al. | 385/14 |
| 5,367,527 A | * 11/1994 | Gruneisen | 372/18 |
| 5,373,526 A | * 12/1994 | Lam et al. | 372/102 |
| 5,541,947 A | * 7/1996 | Mourou et al. | 372/102 |
| 5,568,309 A | * 10/1996 | Rockwell | 359/338 |
| 5,596,667 A | * 1/1997 | Watanabe | 385/122 |
| 5,729,380 A | 3/1998 | Betin et al. | 359/300 |
| 5,920,588 A | * 7/1999 | Watanabe | 372/96 |
| 6,363,087 B1 | * 3/2002 | Rice | 372/3 |
| 6,400,871 B1 | * 6/2002 | Minden | 372/6 |
| 6,404,784 B2 | * 6/2002 | Komine | 359/241 |

FOREIGN PATENT DOCUMENTS

DE 196 04 438 C1 * 2/1996

OTHER PUBLICATIONS

Ageichik, A.A., et al., "Self–phase conjugation of middle infrared radiation by four–wave mixing in active medium of $CO_2$–laser with feedback loop", *SPIE* vol. 2771, 119–125 (1996).

Barashkov, M.S., et al. "Strong reflection of a series of pulses from a four–wave mirror with thermal nonlinearity under parametric feedback conditions", *Sov. J. Quantum Electron.*, vol. 19, No. 4, pp. 518–519, (Apr. 1989).

(List continued on next page.)

*Primary Examiner*—Thomas H. Tarcza
*Assistant Examiner*—Andrew R. Sommer
(74) *Attorney, Agent, or Firm*—Ladas & Parry

(57) ABSTRACT

An optical system for producing high power laser beams has an in/out coupler for receiving an input laser beam from an oscillator. The coupler inputs the beam to a first multiplexer which produces a plurality of beams which are sent to a plurality of fiber amplifiers. A second beam multiplexer receives the thus amplified plurality of beams to combine then into a single amplified beam which is input to a loop PCM (phase conjugate mirror). A multi-mode fiber amplifier is included in the loop PCM. The output of the loop PCM is phase conjugated with the amplified beam input to the loop PCM thereby eliminating any phase and polarization distortions and aberrations occurring in the fiber amplifiers. The output of the loop PCM is supplied in reverse direction through the second multiplexer, the fiber amplifiers and the first multiplexer in that order and then through the in/out coupler as a high power output laser beam.

16 Claims, 5 Drawing Sheets

OTHER PUBLICATIONS

Bel'dyugin, I.M., et al., "Wavefront reversal of optical radiation using feedback in four wave interaction", *Sov. J. Quant. Electron*, vol. 14, No. 5, pp. 602–605 (May 1984).

Berdyshev, A.V., et al., "Formation of amplitude gratings in the medium of a CO laser subject to the field of its own multifrequency radiation", *Quantum Electronics*, vol. 21, No. 1, pp. 91–96 (1994).

Betin, A.A., et al., "DFWM and phase conjugation in absorbing liquids at 1 $\mu$m with 1 to 20 msec duration pulses", *CLEO '95/Technical Digest*, vol. 15, Baltimore, pp. 4–5 (May 1995).

Betin, A.A., et al., "Energy characteristics of a loop laser with a thermal, holographic mirror using millisecond pulses at 1.06$\mu$m," *Nonlinear Optics/Technical Digest*, vol. 11, pp. 92–93 (Jul. 1996).

Betin, A.A., et al., "Generation of radiation by four–wave interaction in a feedback system in the $\lambda$=10$\mu$m range", *Sov. J. Quant. Electron.*, vol. 17, No. 5, pp. 636–640 (1987).

Betin, A.A., et al., "Nonlinear Beam Cleanup For Industrial Solid State Lasers With Fiber Beam Delivery", *Photonics West*/Nonlinear Optical Engineering Conference, San Jose, 6 pages (Jan. 1998).

Betin, A.A., "Phase Conjugation Based on Thermal Nonlinearity", *Nonlinear Optics/Techn. Digest*, vol. 11, Hawaii, pp. 336–39 (Jul. 1996).

Betin, A.A., et al., "Phase Conjugation of Depolarized Light with a Loop PCM", *Nonlinear Optics '98/Technical Digest*, Hawaii, pp. 288–290 (Aug. 1998).

Betin, A.A., et al., "Q–switched Nd:YAG loop laser with a thermal holographic mirror", *CLEO '96*, Anaheim, pp. 448–449 (Jun. 1996).

Betin, A.A., et al., "Selection of a phase–conjugate wave in an oscillator based on a four wave interaction with feedback in an extended nonlinear medium", *Quantum Electronics*, vol. 24, No. 3, pp. 219–222 (1994).

Betin, A.A., et al., "Spatial structure of radiation from a neodymium–glass four–wave feedback oscillator," *Sov. J. Quant. Electron*, vol. 22, No. 8, pp. 715–717 (Aug. 1992).

Betin, A.A., et al., "Vector phase conjugation with loop laser geometry," *CLEO '97*, Baltimore, pp. 102–3 (May 1997).

A.A. Betin, et al., "1–ms–long pulse Nd: YAG laser with Loop PCM"; *CLEO '97*, Baltimore, p. 283 (May 1997).

Dement'ev, A.S., et al., "Emission from a YAG: Nd laser with a four–wave thermal mirror in a ring resonator", *Sov. J. Quant. Electron.*, vol. 18, No. 5, pp. 631–633 (May 1988).

Ergakov, K.V., et al., "Energy optimisation of an Nd: YAG– based four–wave–mixing oscillator with feedback and investigation of its adaptive properties in the pulse–periodic regime", *Quantum Electronics*, vol. 23, No. 5, pp. 399–404 (1996).

Green, R.P.M., et al., "Holographic laser resonators in Nd: YAG", *Optic Letters*, vol. 19, No. 6, pp. 393–395 (1994).

Mathews, S.C., "Aberration correction of ms pulses at 1.06$\mu$m using a loop conjugator with thermal gratings", *CLEO '96, Proc. P. 510*, Anaheim, pp. 510–511 (Jun. 1996).

Sumida, David S. Et al., "Diode–pumped Yb:YAG catches up with Nd:YAG"; *Laser Focus World*, 2 pages (Jun. 1999).

* cited by examiner

HIGH POWER LASER SYSTEM WITH FIBER AMPLIFIERS AND LOOP PCM

FIELD OF THE INVENTION

The invention relates to a high power laser system including optical means comprising fiber amplifiers and particularly to such system in which the amplified laser beam is free from phase distortions and aberrations.

The invention further relates to methods for producing the amplified laser beam with fiber amplifiers without phase distortions and aberrations.

BACKGROUND AND PRIOR ART

An individual fiber amplifier or fiber laser has a limitation on its power output due to laser damage and undesired non-linear effects. In order to increase the power and brightness simultaneously and proportionally, several fiber amplifiers/lasers are combined to produce a single more powerful output laser beam.

Optical systems are known for combining spatial coherent beams from separate amplifiers or amplifying channels by phasing their output beams with the use of a phase conjugation effect in which a technique known as SBS (Stimulated Brillouin Scattering) or a photo refractive phase conjugated mirror (PCM) technique are used to increase the overall power of the laser system as well as compensate for phase distortions and aberrations which the laser beams may encounter along the optical paths in each amplifying channel. However, the SBS technique has only been successful in the case of combining coherent beams from bulk laser amplifiers (preferably slabs in order to avoid depolarization) operating in Q-switch pulse format at a low repetition rate and average power. Neither SBS nor photo refractive techniques are suitable to operate with fiber amplifiers because of either power or pulse format incompatibility and/or inability to compensate for large aberrations and depolarization distortions. Moreover, the photo refractive PCM technique has too long a response time making it impractical for compensation of time variable distortions and vibrations.

SUMMARY OF THE INVENTION

An object of the invention is to provide a high power laser system including fiber amplifiers in which the disadvantages noted above with the conventional systems are avoided.

In accordance with the invention, a high power laser system is provided based on coherent combining of fiber amplifiers with a loop type PCM which includes a multi-mode fiber amplifier. The loop PCM technique associated with the fiber amplifiers makes it possible and practical to increase the output of fiber lasers to a multi-kilowatt power level and the inclusion of the multi-mode fiber amplifier in the loop PCM automatically provides a match between the fiber amplifiers and the loop PCM while making the entire laser system one constituted entirely by fiber technology.

An advantage of the loop PCM technique is that it provides a unique combination of characteristics to satisfy the demanding requirements imposed by the coherent combining of high power laser amplifiers and particularly fiber amplifiers. The loop PCM can operate with relatively low threshold levels (approximately 10 W in the CW regime) and has the ability to increase the power to a kilowatt level at any pulse format from Q-switch pulses to CW and with large aberrations (>100×DL) and also with arbitrary polarization/depolarization, small frequency shift and short coherence length.

The system of the invention is capable of producing moderate to high power laser output having a variety of applications in various electronic systems.

In a first aspect of the invention, an optical system for producing high power laser beams is provided which includes a coupler having an input for receiving an input laser beam, a first multiplexer connected to receive the input laser beam from said coupler to produce a plurality of beams, a plurality of fiber amplifiers to receive respectively said plurality of beams and amplify the same, a second beam multiplexer receiving the thus amplified plurality of beams to combine said plurality of beams into a single amplified beam, and a loop PCM, including a multi-mode fiber amplifier, receiving said amplified beam. The loop PCM provides a loop path for said amplified beam in which said amplified beam is further amplified and phase conjugated with the input amplified beam thereby eliminating any phase and polarization distortions and aberrations occurring in said fiber amplifiers. The loop PCM produces an output beam which is supplied in reverse direction through said second multiplexer, said fiber amplifiers and said first multiplexers in that order and then through said coupler to exit therefrom as a high power output laser beam.

In another aspect of the invention, a method is provided for producing high power laser beams in an optical system which comprises supplying an input oscillated laser beam to a coupler, transforming said input laser beam into a plurality of beams in a first multiplexer, amplifying said plurality of beams in fiber amplifiers, combining the thus amplified plurality of beams into a single beam in a second multiplexer, passing said single beam in a loop PCM in which said single beam is amplified and is output as an output beam which is phase conjugated with the input oscillated beam, and then transmitting said output beam from the loop PCM back to said coupler through said second multiplexer, said fiber amplifiers and said first multiplexer in reverse direction, and finally outputting at said coupler a high power output laser beam.

In another aspect of the invention, the loop PCM technique is combined with a double-pass master oscillator/power amplifier (MOPA) laser system. This has a number of advantages compared to the use of a conventional adaptive optics system insofar that the loop PCM technique phases the output of the amplifiers and compensates for optical distortions of the amplifiers and of all optical elements in the entire laser system automatically. Consequently, there is no need to use beam profile analyzers, phase measurements and the like as in the known adaptive optics system. The PCM technique also eliminates misalignment and depolarization of the beams. Furthermore, the double-pass amplification provides higher gain and efficiency.

DETAILED DESCRIPTION OF THE INVENTION

Figure 1:
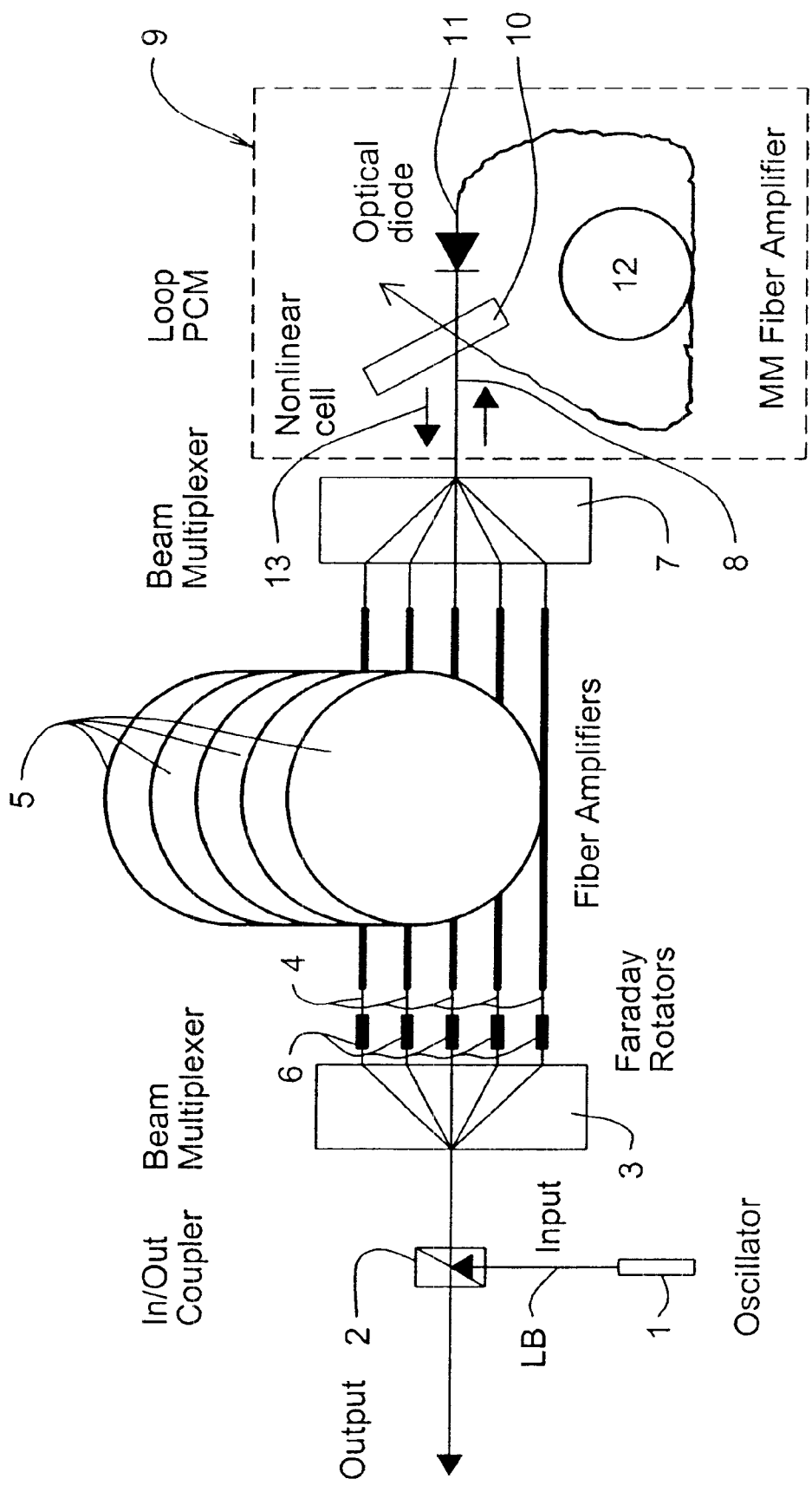
FIG. 1 is a diagrammatic illustration of an embodiment of the invention.

Referring to FIG. 1. therein is seen an optical system according to the invention in which a reference linear polarized laser beam LB is produced by an oscillator 1 as a reference value 1 DL. The beam LB is directed by an in/out coupler 2, to a beam multiplexer 3. The beam multiplexer 3 transforms the input beam LB into a plurality of beams 4. The beams 4 are supplied to an equal plurality of respective fiber amplifiers 5. An equal number of Faraday rotators are placed in the paths of the beams 4 being supplied to the respective amplifiers 5 to provide a separation of the powerful output laser beams 6 from the input beam LB of the oscillator 1. After amplification in the fiber amplifiers 5, the beams are recombined by a second beam multiplexer 7 into a single resultant beam 8. At this point, the beam 8 may have severe phase and depolarization distortions depending on the number of amplifiers, the quality of the optical elements and the like.

The beam 8 then is introduced into a loop PCM 9. Within the loop PCM 9, the beam 8 passes through a thermal non-linearity cell 10, an optical diode 11, a multi-mode fiber amplifier 12 back to the cell 10 where the two beams write a thermal non-linearity hologram. If the product of the reflectivity of the hologram and the net gain of the amplifier 12 is greater than one, the loop PCM generates a laser beam and due to the optical diode 11, the direction is opposite the incident beam 8. It is significant that the output beam 13 is in phase conjugation with the incident beam 8 whereby the loop PCM operates as a phase conjugate mirror. The output beam 13 of the loop PCM travels in reverse direction and is amplified in the fiber amplifiers 5 and, due to the phase conjugate effect, the output beams from the fiber amplifiers are coherently recombined in beam multiplexer 3 into one beam reproducing the initial spatial distribution of the input oscillator beam LB. Finally, the powerful output beam which has extracted the energy stored in the amplifiers exits from the system by separation from the oscillator beam path at the polarizing in/out coupler 2 due to the 90 degree rotation of polarization relative to the polarization of the input beam after two passes through the Faraday rotators 6.

Figure 2:
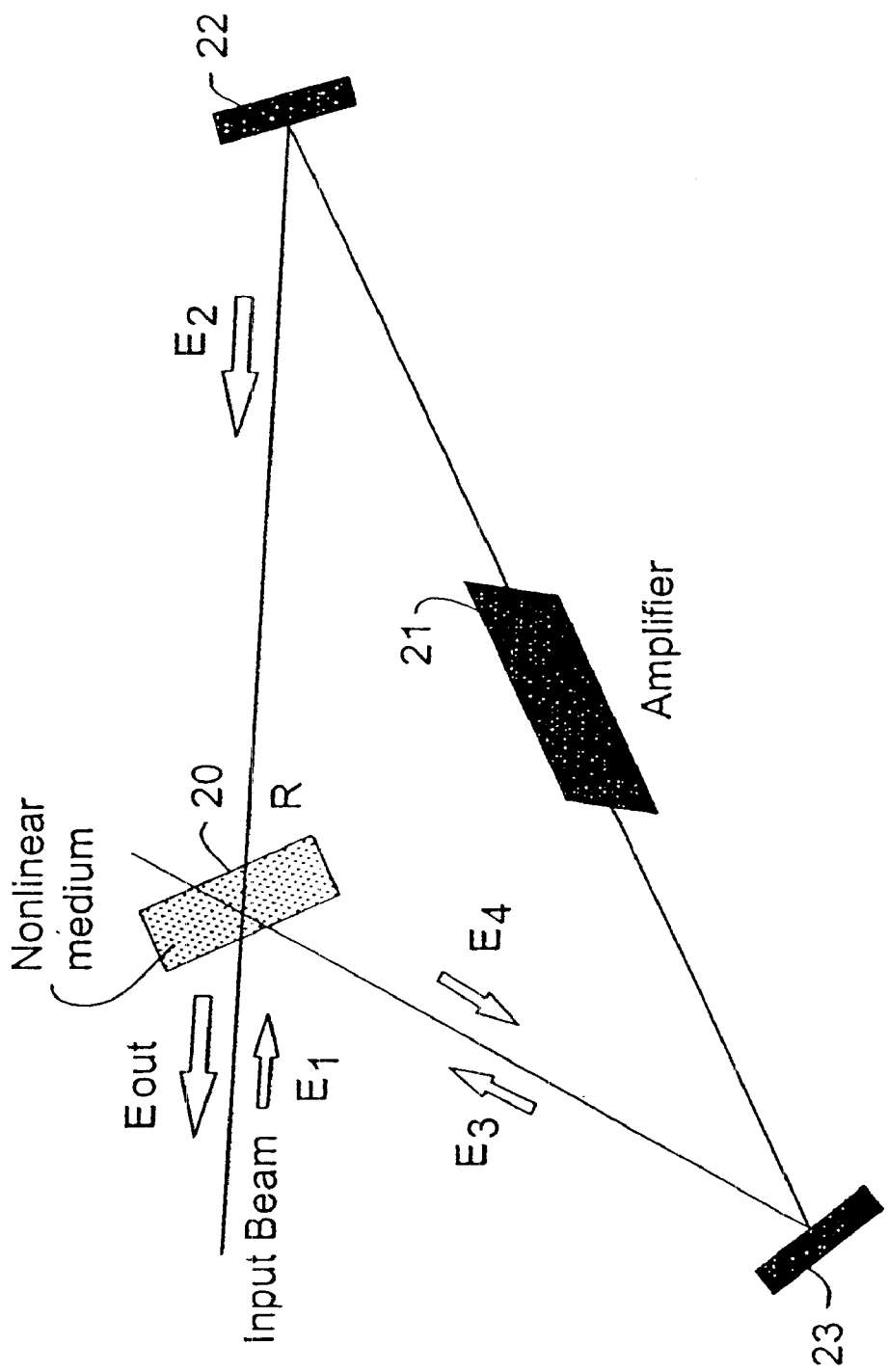
FIG. 2 diagrammatically illustrates the operation of a loop PCM of the embodiment in FIG. 1.

FIG. 2 explains the principle of operation of the loop PCM technique. The technique per se is known and, as seen in FIG. 2, an input beam $E_1$ first passes through a non-linear medium 20 which can be a simple absorption cell. The input beam $E_1$ is then directed through an amplifier 21 with gain G by mirrors 22 and 23 back to absorption cell 20 to form a loop or ring. The amplified beam $E_3$ is directed to intersect input beam $E_1$ at a small angle in the absorption cell 20. These propagation beams have sufficient coherence length to form an interference pattern in the non-linear medium which produces an associated index grating of modulation dn~$E_1$ $E_3$. The grating is characterized by a reflectivity R which closes the loop and allows ring laser oscillation under the condition that RG is greater than one. Not shown, but in most cases utilized for best performance is a non-reciprocal optical diode that prevents saturation of the loop amplifier by the incoming input beam and preferentially selects the ring oscillation to be in the direction opposite the input beam. Being the laser oscillation mode, beam E2 starts from spontaneous noise, diffracts from the grating to become beam E4 and is amplified as it passes around the loop and becomes E2. The grating and loop resonator select beam E2 to be phase conjugated to the input beam. The portion of E2 which is transmitted by the grating is finally the output beam $E_{out}$ which is phase conjugate to E1 and may be greater in amplitude. Any type of non-linear means for recording a grating hologram can be used but in general the thermal non-linearity in liquids and gain saturation effect in the active medium of the amplifier itself is utilized.

Figure 3:
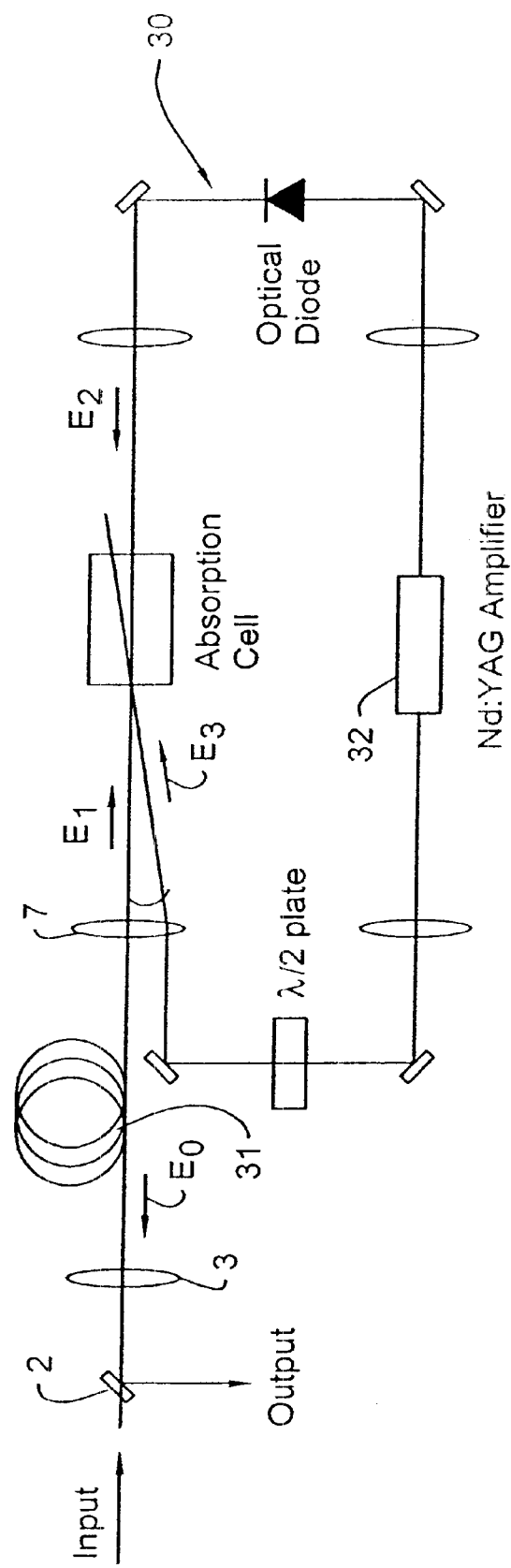
FIG. 3 is a diagrammatic illustration of a modification of the embodiment of the invention.

FIG. 3 shows an embodiment of a system employing a loop PCM 30 with PC-MOPA development. In a particular mode of operation, the system is operated at $\lambda=1.06$ $\mu$m wavelength to deliver a quality laser beam of one kilowatt power through a multi-mode fiber 31. The loop PCM 30, based on the use of thermal non-linearity, is able to operate as a vector PCM with the following combination of laser radiation parameters:

1. Q-switch to loop (>1 msec) pulses and CW radiation.
2. Low threshold (10 W in CW regime) and scalability to high average power.
3. Reflectivity of 5 in CW regime.
4. Large aberrations compensation, of 100×DL, with PC fidelity of 60%.
5. Arbitrary depolarization compensation with polarization restoration close to 100%.
6. Response time is better than 0.1 mesc.

Figure 4:
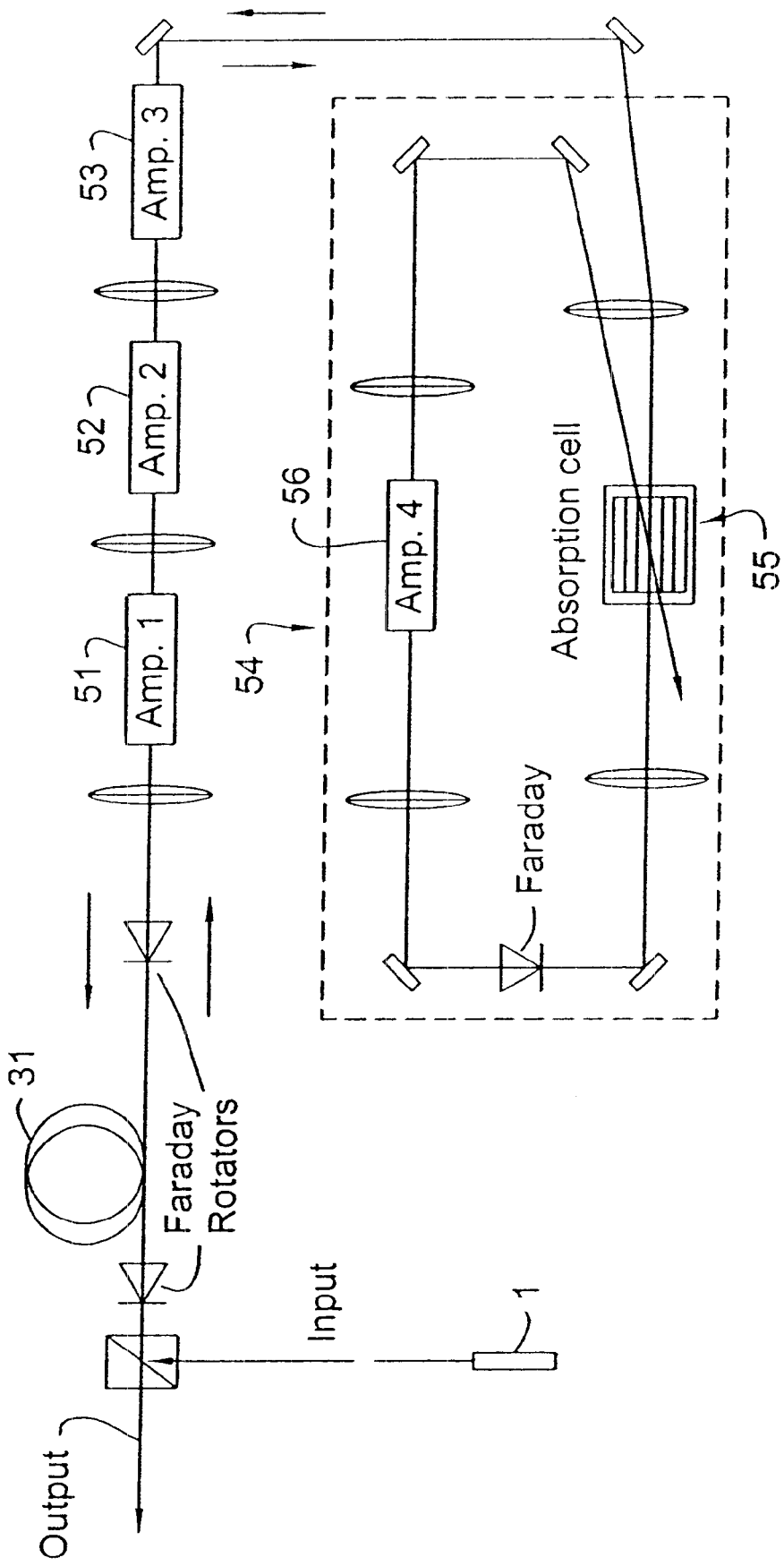
FIG. 4 is a diagrammatic illustration of a further modification of the invention.

In the embodiment of FIG. 3, the same reference numerals are used to designate the same elements in FIG. 1. As distinguished from FIG. 1, the embodiment of FIG. 3 utilizes a commercial Nd.YAG flashlamp-pumped amplifier 32 in the loop PCM. The fiber 31 is a 0.6 mm diameter 10 m long multi-mode fiber. The aberrations caused by the fiber are compensated by the loop PCM. Additionally, included in the loop PCM and not described further are a number of conventional elements including mirrors and lenses and a $\lambda/2$ plate. FIG. 4 shows a modified embodiment which contains a MOPA system of four amplifiers. As in the embodiment of FIG. 3 the system includes fiber 31. In the embodiment in FIG. 4, the input beam passes through fiber 31 as in FIG. 3 and is amplified in amplifiers 51, 52, and 53 to increase the beam power whereafter the amplified beam is reflected by mirrors in the loop PCM 54 and supplied as an input beam to absorption cell 55 where the beam is phase conjugated with the input beam from oscillator 1. The beam in loop PCM is amplified in amplifier 56 and is output as a phase conjugate beam. The system operates with the input beam at 1 msec pulse duration at a maximum repetition rate of 40 Hz. By virtue of a relatively small signal gain in the amplifier chain of about 1,000 and undersaturation by the powerful output beam the extraction efficiency of stored energy from the amplifier chain is greater than 50%. However, the major result is the compensation of severe phase and polarization distortions that the laser beam experiences when passing through the fiber 31.

Figure 5A:
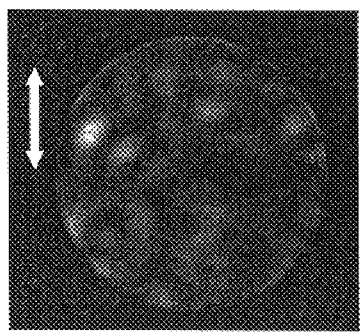
FIGS. 5A, 5B and 5C are illustrations showing polarization fidelity obtained by the invention.
Figure 5B:
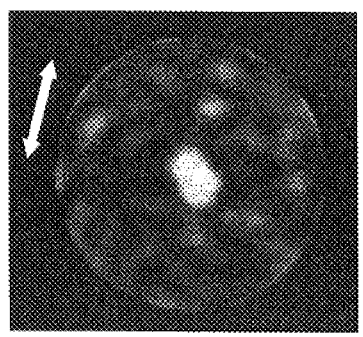
Figure 5C:
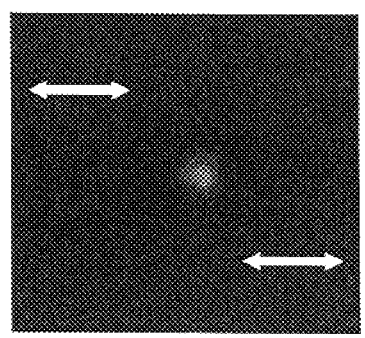

FIG. 5A shows the laser beam output from the master oscillator 1 and FIG. 5B shows the laser beam after passing through the fiber towards the loop PCM. FIG. 5C shows the beam at the output of the loop PCM. It is seen that the output beam from the loop PCM has a polarization restoration of better than 99.5%. As a result of compensation of approximately 100×DL aberrations, it is determined that the loop PCM is able to perform coherent coupling of approximately 10,000 single-mode fibers.

In the various disclosed embodiments the components can be of various types. For example, the beam multiplexers may be made of diffractive optical elements or constructed as a simple lens array. The fiber amplifiers can be single or multi-mode type. However, the following features and/or requirements should be noted.

1. The beam multiplexers should provide approximately 100% efficiency in transmitting the oscillator beam to the fiber amplifier array.
2. The system operates effectively only if a small signal gain of the amplifiers is sufficiently large so that the gain even under saturation should be in the range of 30 to 100 or more.
3. The loop PCM should provide not only the required amount of power but it should be able to compensate the aberration and polarization distortions of the recombined beam after the fiber amplifiers. Accordingly, the loop PCM and the multi-mode fiber amplifier in particular should have the ability to transmit the aberrated oscillation beam without losses and obscuring.

4. The output power of the laser system and the requirements of its components is based on the power capacity of the individual amplifiers in the array. The multimode fiber amplifier can comprise an array of approximately 1,000 fiber amplifiers whereupon the output power of the laser system will be about 100 kW. If the saturated gain of the amplifier is 100 the required output power from the loop PCM will be about 1 kW.

In sum, the invention is based on the use of the loop PCM technique to obtain multi-kilowatt level output with automatic compensation for optical distortions and aberrations while the utilization of the multi-mode fiber amplifier in the loop PCM automatically provides a match between the fiber amplifier chain and the loop PCM. Finally, the entire laser system becomes an all-fiber system.

Although the invention has been described in conjunction with particular embodiments thereof, it will become apparent to those skilled in the art that numerous modifications and variations can be made without the departing from the scope and spirit of the invention as defined in the attached claims.

What is claimed is:

1. An optical system for producing high power laser beams comprising:
   an in/out coupler having an input for receiving an input laser beam;
   a first beam multiplexer connected to receive the input laser beam from said coupler to produce a plurality of beams;
   a plurality of fiber amplifiers to receive respectively said plurality of beams and amplify said plurality of beams;
   a second beam multiplexer receiving the thus amplified plurality of beams to combine said amplified plurality of beams into a resultant amplified beam; and
   a phase conjugate mirror arrangement, including a multi-mode fiber amplifier, said phase conjugate mirror arrangement having an input receiving said resultant amplified beam, said phase conjugate mirror arrangement providing a loop path for said resultant amplified beam in which said resultant amplified beam is further amplified and phase conjugated with said resultant amplified beam received at the input of said phase conjugate mirror arrangement thereby eliminating any phase and polarization distortions and aberrations occurring in said fiber amplifiers,
   said phase conjugate mirror arrangement producing an output beam which is supplied in reverse direction through said second multiplexer, said fiber amplifiers and said first multiplexer in that order and then through said in/out coupler as a high power output laser beam.

2. An optical system as claimed in claim 1, further comprising an oscillator for producing said input beam with linear polarization.

3. An optical system as claimed in claim 1, further comprising a plurality of Faraday rotators connected between said first multiplexer and said plurality of fiber amplifiers.

4. An optical system as claimed in claim 1, wherein said phase conjugate mirror arrangement includes a thermal non-linearity cell connected in said loop path.

5. An optical system as claimed in claim 1, wherein said phase conjugate mirror arrangement further includes an optical diode in said loop path.

6. An optical system as claimed in claim 1, further comprising an additional amplifier to receive said resultant amplified beam before introduction to said phase conjugate mirror arrangement.

7. A method of producing a high power laser beam in an optical system comprising:
   supplying an input laser beam to an in/out coupler;
   transforming said input laser beam from said coupler into a plurality of beams in a first multiplexer;
   amplifying said plurality of beams in fiber amplifiers;
   combining the thus amplified plurality of beams into a single resultant amplified beam in a second multiplexer;
   passing said resultant amplified beam in a loop through a phase conjugate mirror arrangement in which said resultant amplified beam is amplified with a multi-mode fiber amplifier and is output as an output beam which is phase conjugated in reverse direction with the input laser beam;
   transmitting said output beam from the phase conjugate mirror arrangement in reverse direction, back to said in/out coupler through said second multiplexer, said fiber amplifiers and said first multiplexer; and
   outputting at said in/out coupler a high power output laser beam.

8. A method as claimed in claim 7, wherein said single resultant amplified beam supplied to said phase conjugate mirror passes through a non-linear cell to the multi-mode fiber amplifier which produces an amplified output signal, reflecting said amplified output signal from said multi-mode fiber amplifier back to said non-linear cell whereat a phase conjugated beam is produced which passes in reverse direction in said loop for output therefrom as said output beam from said phase conjugate mirror arrangement.

9. An optical system for producing a high power optical beam comprising:
   an optical in/out coupler, said optical in/out coupler having an optical input port receiving an input optical beam, an optical output port transmitting a high power optical beam, and an optical bi-directional port receiving and transmitting an optical beam;
   a first bi-directional beam multiplexer, said first bi-directional beam multiplexer having a single beam port and a plurality of multiplexed beam ports, said single beam port coupled to said optical bi-directional port of said optical in/out coupler;
   a plurality of beam-separating devices, each beam-separating device of said plurality of beam-separating devices having a first port and a second port, each first port of said beam-separating devices coupled to a separate multiplexed beam port of said plurality of multiplexed beam ports;
   a plurality of fiber amplifiers, each fiber amplifier of said plurality of fiber amplifiers having a first port and a second port, each first port of each fiber amplifier of said plurality of fiber amplifiers coupled to the second port of a respective beam-separating device of the plurality of beam-separating devices;
   a second bi-directional beam multiplexer, said second bi-directional beam multiplexer having a single resultant beam port and a plurality of multiplexed amplified beam ports, each multiplexed amplified beam port of said plurality of multiplexed amplified beam ports coupled to the second port of a respective fiber amplifier of said plurality of fiber amplifiers; and a loop phase conjugated mirror, said loop phase conjugated mirror having a bi-directional optical port coupled to said single resultant beam port of said second bi-directional beam multiplexer, said loop phase conjugated mirror including a multi-mode fiber amplifier.

10. The optical system as claimed in claim 9, further comprising an oscillator generating said input optical beam with a linear polarization, said oscillator coupled to said optical input port of said optical in/out coupler.

11. The optical system as claimed in claim 10, wherein each beam-separating device of said plurality of beam-separating devices provides 45 degrees of polarization rotation.

12. The optical system as claimed in claim 11, wherein at least one beam-separating device of said plurality of beam-separating devices comprises a Faraday rotator.

13. The optical system as claimed in claim 9, wherein said loop phase conjugated mirror comprises a thermal non-linearity cell.

14. The optical system as claimed in claim 9, wherein said loop phase conjugated mirror further comprises a an optical diode.

15. The optical system as claimed in claim 9, wherein each fiber amplifier of said plurality of fiber amplifiers has a small signal gain greater than 30.

16. The optical system as claimed in claim 9, wherein each fiber amplifier of said plurality of fiber amplifiers has a small signal gain greater than or equal to 30 and less than or equal to 100.

* * * * *